US007386154B2

(12) United States Patent
Cosmi

(10) Patent No.: US 7,386,154 B2
(45) Date of Patent: Jun. 10, 2008

(54) METHOD TO IDENTIFY THE MECHANICAL PROPERTIES OF A MATERIAL

(75) Inventor: Francesca Cosmi, Udine (IT)

(73) Assignee: Universita Degli Studi Di Trieste, Trieste (IT)

(*) Notice: Subject to any disclaimer, the term of this patent is extended or adjusted under 35 U.S.C. 154(b) by 780 days.

(21) Appl. No.: 10/509,512

(22) PCT Filed: Mar. 27, 2003

(86) PCT No.: PCT/IB03/01127

§ 371 (c)(1),
(2), (4) Date: Sep. 28, 2004

(87) PCT Pub. No.: WO03/082118

PCT Pub. Date: Oct. 9, 2003

(65) Prior Publication Data

US 2005/0117788 A1 Jun. 2, 2005

(30) Foreign Application Priority Data

Mar. 29, 2002 (IT) .......................... UD2002A0072

(51) Int. Cl.
*G06K 9/00* (2006.01)
(52) U.S. Cl. ...................... 382/128; 382/131; 424/577; 600/562
(58) Field of Classification Search ................ 382/128, 382/129, 130, 131, 132, 133; 378/4, 21, 378/23, 24, 25, 26, 27, 54; 128/920, 922; 530/388.7, 388.73, 388.75, 389.6, 840; 600/407, 600/410, 415, 425, 562; 606/74, 86, 92; 607/51; 424/577
See application file for complete search history.

(56) References Cited

U.S. PATENT DOCUMENTS 5,172,695 A * 12/1992 Cann et al. .................. 600/407
6,320,928 B1 * 11/2001 Vaillant et al. ................ 378/4

(Continued)

FOREIGN PATENT DOCUMENTS

WO          0132079          10/2001

OTHER PUBLICATIONS

C.E. Waud et al: "The Relationship Between Ultrasound and Densitometric Measurements of Bone Mass at the Calcaneus in Women", Calcif. Tissue Int. (1992) 51:415-418.

(Continued)

*Primary Examiner*—Abolfazl Tabatabai
(74) *Attorney, Agent, or Firm*—Novak Druce & Quigg, LLP

(57) ABSTRACT

Method to identify the mechanical properties of a material starting from at least a digitalized image of a sample of the material. The image of the sample to be analyzed is processed to achieve a numerical model comprising a determinate number of elementary geometric elements, or cells, to each of which a parameter to identify the type of matter is assigned, in order to obtain information on the distribution of the mechanical characteristics in the individual units of the sample, from which it is possible to trace both the elastic characteristics and hence the resistance, and also the distribution of stresses and strain in relation to the application of the loads.

12 Claims, 7 Drawing Sheets

U.S. PATENT DOCUMENTS 6,529,617 B1 * 3/2003 Prokoski .................... 382/128
6,560,476 B1 5/2003 Pelletier et al.

OTHER PUBLICATIONS

R. Hodgskinson et al., "The effect of variation in structure on the Young's modulus of cancellous bone: a comparison of human and non-human material", P.I.M.E., J. of Engineering in Medicine, 204 (1990), pp. 115-121.

J. Homminga et al., "Introduction and evaluation of a gray-value voxel conversion technique", Nov. 27, 2000, Journal of Biomechanics 34 (2001) 513-517.

E. Tonti, "A Direct Discrete Formulation of Field Laws: The Cell Method", CMES, vol. 2, No. 2, pp. 237-258 (2001).

B. M. Martin, "Determinants of the Mechanical Properties of Bones", *J Biomechanics* vol. 24, Suppl. 1. pp. 79-88 (1991).

Ishida T et al: "Trabecular Pattern Analysis Using Fractal Dimension" Japanese Journal of Applied Physics, Publication Office Japanese Journal of Applied Physics. Tokyo, JP, vol. 32, No. 4, Part 4, Apr. 1993, pp. 1867-1871, XP001092781 ISSN: 0021-4922 pp. 1868, right-hand column, line 13-page 1869, left-hand column, line 13.

Tonti E: A Direct Discrete Formulation of field Laws: "The Cell Method" Computing Modeling in Engineering and Sciences, Tech Science Press, Palmdale, CA, US, vol. 2, No. 2 (2001), pp. 237-258, XP008024158 ISSN: 1526-1492.

* cited by examiner

METHOD TO IDENTIFY THE MECHANICAL PROPERTIES OF A MATERIAL

This application is a §371 National Stage Application of International Application No. PCT/IB03/01127, filed on 27 Mar. 2003, claiming the priority of Italian Patent Application No. UD2002A000072 filed on 29 Mar. 2002.

FIELD OF THE INVENTION

The present invention concerns a method to identify the mechanical properties of a material, such as for example a bone material, starting from at least a digitalized image of a sample of said material. The image of the sample to be analyzed is processed to achieve a numerical model comprising a determinate number of elementary geometric elements, hereafter called cells, to each of which a parameter to identify the type of material is assigned, in order to obtain information on the distribution of the mechanical characteristics in the individual units of the sample, from which it is possible to trace both the elastic characteristics and hence the resistance, and also the distribution of stresses and strain in relation to the application of the loads.

BACKGROUND OF THE INVENTION

It is known that to diagnose and treat bone pathologies, such as for example osteoporosis, it is first of all necessary to evaluate the mechanical properties, particularly elasticity and resistance to applied loads.

In order to estimate the resistance and elasticity of the bone with a good level of accuracy, however, it is not enough to know its composition and density. The elastic properties of the bone tissue depend to a large extent on the architecture of the bone structure in the sample in question, as is known, for example, from: Martin, R. B. (1991) J. Biomech., 24, 79-88, and from: Waud, C. E. et al. (1992) Calcif. Tissue Int., 51, 416-418; and mechanical resistance is linearly proportionate to the value of Young modulus [Hodgkinson, R. J., Currey, D. (1990) P.I.M.E., 204, 115-121]. At present, the mechanical properties of the bones, and in particular the parameters related to elasticity and strength, cannot be determined by mechanical tests performed on the patient. Nor, for obvious reasons, is it appropriate to use bone samples taken from the patient on which the tests are to be performed in machines suitable for mechanical characterization. On the other hand, techniques for processing medical images have become very accurate, making it possible to perform digital modelling of the bone structure on different levels of definition, up to the range of some tenths of a micron.

The numerical methods at present employed for modelling and simulating the behavior of the bone structure for the purposes of estimating the mechanical properties have recourse to implementations of the finite elements method, known for example from Homminga, J. et al. (2001) J. Biomech., 34, 513-517.

This method, however, has the disadvantage that it does not allow to discretize the image easily, that is, to create a set of geometrical elements able to reproduce the structure examined as faithfully as possible and on which it is then possible to perform processing and elementary quantifications.

This operation, moreover, is long and laborious, to a large extent entrusted to the ability and experience of an operator, since the set of geometric elements has to be adapted to the conformation and irregularities of the bone structure examined.

Another application of the finite elements method provides to make a geometric element correspond to every voxel, or elementary volumetric unit, of the image acquired; however, this solution has the disadvantage that there is a very high number of elements present, such that processing the numeric model generated requires the use of computer networks which are not available in normal centers of analysis.

If the resolution, that is, the degree of detail, of the image is diminished in order to reduce the number of elements, the validity of the solution obtained inevitably declines.

In the case of identification of the bone micro-structure, another application of the finite elements method provides to use, as finite elements, rods of different length and section, constrained together so as to reproduce the trabecular structure.

This type of modeling generates, on the one hand, a number of unknowns low enough to be processed without particular strategies, but, on the other hand, the result obtained is not accurate enough.

The present Applicant has devised and embodied this invention to overcome these shortcomings of the state of the art, and to obtain other advantages.

SUMMARY OF THE INVENTION

The present invention is set forth and characterized essentially in the main claim, while the dependent claims describe other innovative characteristics of the invention.

One purpose of the invention is to perfect a method by means of which it is possible to identify, in an accurate manner, the specific mechanical properties of a material, such as for example a bone material, in relation to the particular conformation of the structure which the material assumes.

Another purpose is to perfect a method to calculate the mechanical properties of a material irrespective of the presence or absence of other heterogeneous materials incorporated in the base material.

In accordance with these purposes, a method to identify the mechanical properties of a material according to the present invention comprises a first step to acquire at least one digital image of a sample of the material to be examined, a second step which, for every elementary unit of said digital image, acquires at least one predetermined parameter indicative at least of the presence or absence, and/or the type of matter in the elementary unit itself, a third step to construct a grid of elementary geometric elements or cells able to be associated with the digital image, and a fourth step to assign, for each cell, an index to represent the characteristics of the type of matter of the sample of material which occupies the position of a relative cell, in relation to the parameters possessed by the elementary image units associated with said cell. A fifth step defines the mechanical characteristics of each cell according to the corresponding index and the mechanical properties of the type of matter, and a sixth step determines the mechanical properties of said material according to numerical simulations performed with the known Cell Method (Tonti, E. CMES, 2, 237-258). To be more exact, in the course of said numerical simulations, the strains, the stresses and/or the distribution of the stresses suffered by the sample examined are analyzed, according to the mechanical characteristics of the cells, defined during the aforementioned fifth step.

In the method according to the present invention, an image or a series of images, such as for example a micro-CT (computerized micro-tomography), a micro-MRI (micromagnetic resonance), a CAT (computerized axial tomography), an NMR (nuclear magnetic resonance), a digital or digitalized radiography or similar, of the portion of material examined, is divided into elementary units, voxels in the case of three-dimensional images, or pixels in the case of two-dimensional images.

According to a variant, before being further processed, the image is subjected to at least one filtering process in order to eliminate the distortions due to the measuring instrument. Subsequently, for every elementary image unit, the possible presence of one or more than one of the materials searched for is identified. In other words, by means of appropriate calculation mechanisms that use, for example, threshold algorithms or other similar or comparable method, the presence or absence is discriminated, in the specific elementary image unit, of the material of the sample examined. The data concerning the distribution of the mass in the sample is then processed so as to form an image that can be black and white and comprise a suitable number of intermediate shades of gray. Each elementary image unit is identified, in this case, not only by the three spatial coordinates, but also by the predetermined parameter comprising, in this case, the relative value of the shade of gray. Examining the shade of gray in a bone material also allows to discriminate the presence of an implant or a prosthesis.

According to one solution of the invention, above the image a grid is defined of some thousands points, or nodal points, which serve to construct the numerical model for the structure calculation forming the cells on which processing is performed. The grid of nodes covers the whole image, irrespective of the presence or absence, at some points thereof, of matter. The distance between the nodal points constitutes the lower limit of the size of the calculation structure under examination, therefore the definition of a desired sensitivity imposes a minimum distance between the nodes to be used in the specific application.

Using the base mechanical characteristics, or constitutive law, of the material examined as a calculation parameter, such as for example elastic-linear, elastic-plastic, with or without work hardening, isotropy or anisotropy or similar, the mechanical characteristics of each cell are found also according to the value assumed by the corresponding index obtained from the indexes of the corresponding elementary image units.

The calculation method thus obtained allows to perform an analysis under load by means of the aforementioned Cell Method.

According to a first operative solution, the aforesaid Cell Method is applied in the static formulation, although other formulations could also be applied.

The Cell Method provides to simulate the application of loads on the structure. Moreover, load tests are simulated, in the sense of application of forces, pressures or torques, or displacements imparted at points of the structure; the load may be concentrated or distributed at points, lines or surfaces of the cells, or on their relative combinations, in predetermined directions, in order to obtain a plurality of specific displacements of the nodal points of the model following the application of the simulated loads. The static analysis of the displacements obtained allows to determine a plurality of mechanical properties of the material examined, such as the elastic properties of the structure, the distribution of stresses and strains, and the zones of maximum stress inside the material itself, and also the equivalent stresses according to different failure theories.

The method according to the present invention has the advantage, compared to the traditional finite elements method, that it automates the division into discreet geometric elements, such as cells, without needing to have recourse to an excessive number of unknowns and also when there is a heterogeneity of materials or when there is no matter in some points.

When a grid of nodal points is used, an index is attributed to each of them, proportionate to the value of the shade of gray of the elementary unit (voxel, pixel . . . ) of the digital image. The nodes are then connected, to create a geometric element or cell, triangular in shape or any other geometric shape. A further index is attributed to each cell, which is a function of that of its nodes, which is representative of the structure of the material that, in the image, occupies the position of the cell in the calculation model.

In a first embodiment, the cells are determined once and for all and entirely cover the whole region, plane or spatial, which is examined.

In a variant, a set of cells is created locally from each node. One node is considered at a time and the node examined is taken as the vertex, while a certain number of nearby nodes are used to construct a local complex of cells, which all have a vertex in the same node examined. This process is repeated for all the nodes. Since a limited number of cells are considered at a time, the process is simpler, especially in the case of a three-dimensional model.

The method according to the present invention can easily be implemented in any processor, whether it be an electronic processor or the processor inside a machine, for example a machine for digital radiography. The processor can be used directly by a medical operator for the accurate diagnosis of the bone properties, or to evaluate the validity of a prosthesis implanted in a patient, for example, by means of determining the flow lines of a load or quantifying the state of stress and/or strain.

BRIEF DESCRIPTION OF THE DRAWINGS

These and other characteristics of the present invention will become apparent from the following description of a preferential form of embodiment, given as a non-restrictive example, with reference to the attached drawings wherein.

DETAILED DESCRIPTION OF SOME PREFERENTIAL FORMS OF EMBODIMENT

In accordance with a first form of embodiment, with reference to FIGS. 1 to 7, the method according to the present invention is used to identify the specific mechanical properties of a bone sample of about 8 mm in diameter and 10 mm in height, taken from a pig's femur and subjected to a chemical stabilization process. A digital micro-CT image (FIG. 1) of the bone portion was obtained, in synchrotron light, at the SYRMEP line (ELETTRA-Trieste) of a 3.54× 6.72 mm portion inside the sample. Using a portion inside the sample allows to avoid improper alterations on the edges following the cutting procedure with which the sample itself is obtained. The method provides to assume, as an input parameter, the mechanical characteristics of the base bone structure, and particularly the constitutive law. The image is then first processed by means of appropriate algorithms in order to eliminate artifacts generated by the measuring instrument. The images thus processed comprise hollow regions and full regions, divided into elementary units of a three-dimensional image, such as voxels, each identified by three coordinates and a fourth datum related to the shade. The image processed in three dimensions (FIG. 2) was sectioned on four parallel adjacent planes, corresponding in all to a thickness of 56 micron, in order to obtain four images of the bone sample. To each of these images a threshold filter was applied, using the convention of assigning the value "0" to the hollow regions and "1" to the regions with bone. The four images were added, so that each point of the image, according to the quantity 0 or 1, assumed a value of a shade of gray between 0 and 4. The result can be represented graphically with a two-dimensional image of the type shown in FIGS. 3 and 6.

Figure 1:
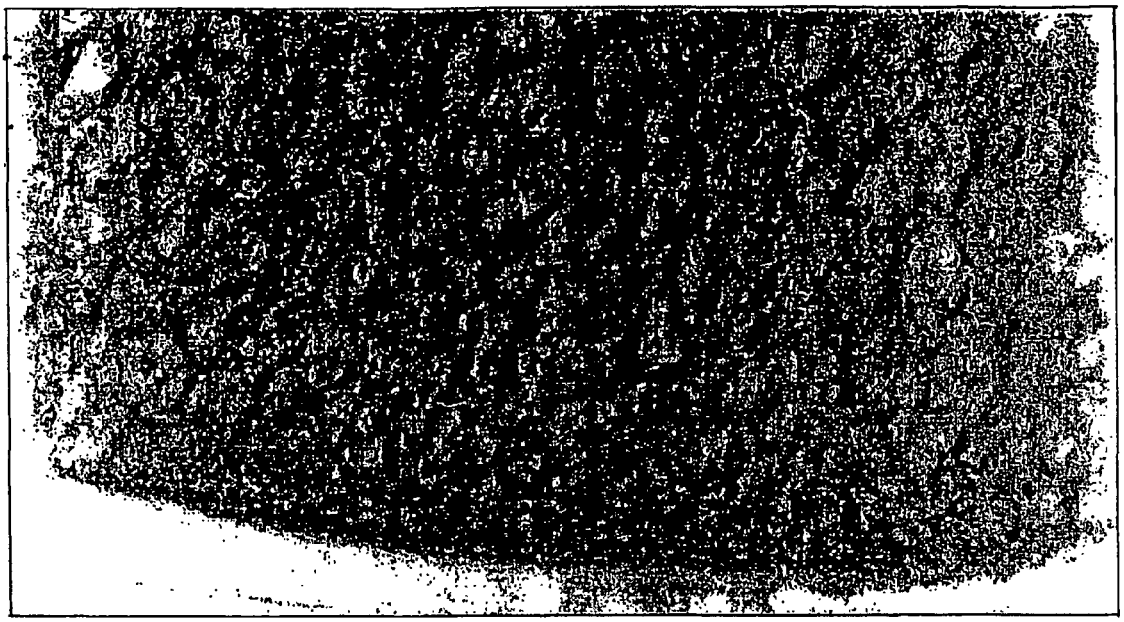
FIG. 1 is a digital image obtained with a MICRO-CT instrument.
Figure 2:
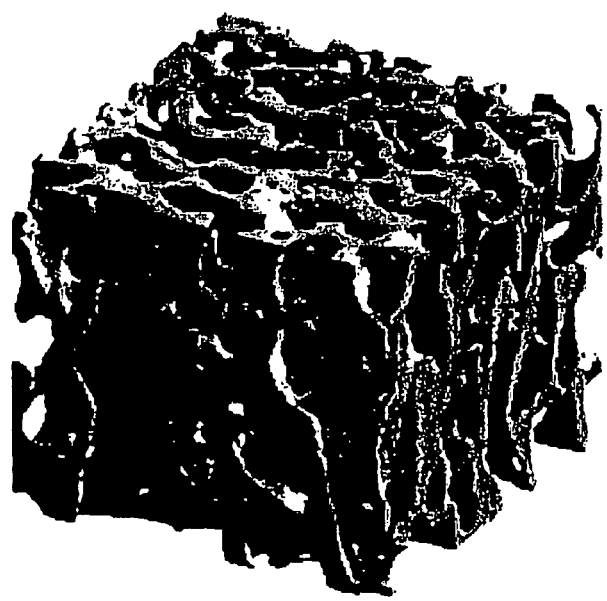
FIG. 2 is a reconstructed image in three dimensions starting from a series of digital images like those in FIG. 1.
Figure 3:
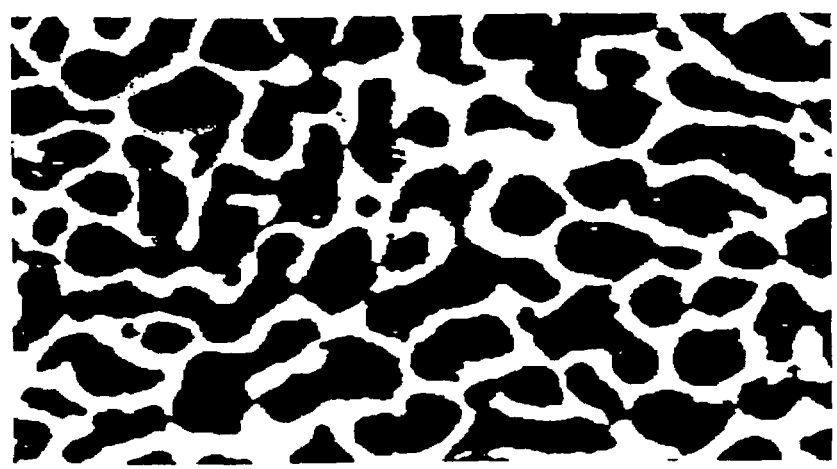
FIG. 3 is a processed image of some sections of the image in FIG. 2.
Figure 4:
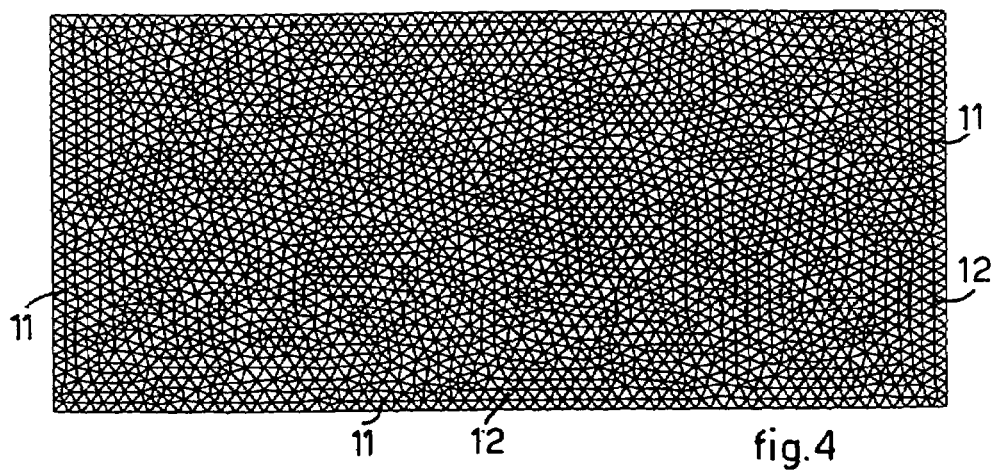
FIG. 4 is a complex of cells of a triangular type.
Figure 5:
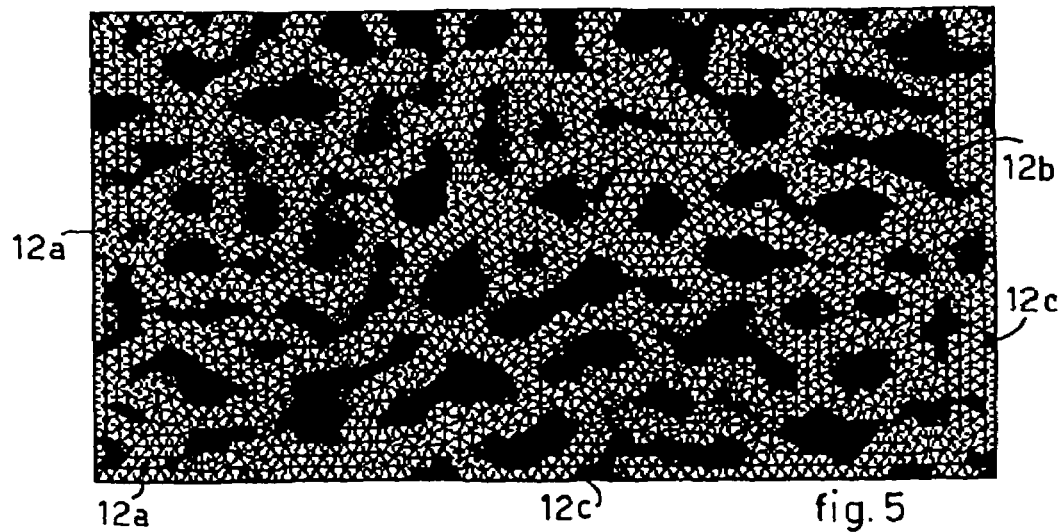
FIG. 5 is a discreet structure image corresponding to the image in FIG. 3.

On the resultant image a grid of 2769 nodes 11 was deposited (FIG. 4). The average distance between the nodes 11, depending on the sensitivity of the results to be obtained, was fixed at 106 micron. The nodes 11 were connected to each other so as to form a complex of 5340 triangular cells 12. An index value to be attributed to each cell 12 was then obtained by adding together the values of the indexes of the corresponding nodes 11 which constitute the vertexes thereof and normalizing the result to 1. The physical significance of the index of the cell 12 as thus defined is that it gives an indication of the percentage of bone in the cell 12. FIG. 5 shows the result of this operation.

The base mechanical characteristics were assumed for the bone, such as an elastic-linear isotropic constitutive law with a Poisson ratio of 0.3 for all the cells 12 that have an index other than 0. The cells 12a with an index of 0 represent cavities, that is, boneless portions, and do not possess any mechanical characteristics. In the cells 12b with an index of 1, a Young module (elastic module) was assumed, equal to 1 GPa. In the cells 12c that have intermediate index values, the Young module was related to the value of the index. For example, if in a cell the index value is 0.5, the Young module of the cell is 0.5 GPa, and so on. FIG. 5 is therefore representative of the values assumed by the Young module of each cell 12. Moreover, a suitable factor was used to define the porosity of the bone structure examined. Given that the index ($I_{cell}$) of each cell 12 represents the quantity of bone material present in the cell, the sum of all the indexes divided by the number of cells 12 ($N_{cells}$) indicates the percentage of bone structure in the sample. The complement of 1 is therefore assumed as the porosity factor fp:

$$f_p = 1 - \frac{I_{cell}}{N_{cells}}$$

For the bone structure examined the porosity factor was equal to 60.9%.

The model of cells 12a, 12b, 12c was then subjected to a compression test simulated along the long side of the image (x axis). However, it comes within the field of the present invention that compression and shear tests can be simulated in different directions, or simulations of different types of test, for example with one or more loads concentrated or distributed (pressures) at points of the model, also as chosen by the operator, and different constraint conditions can be recreated, so as to obtain the values of the displacements of the nodes 11 of the model, following the application of the simulated loads. In this specific case, displacements of the nodes on one end (the vertical side of the image) of the model of cells 12 were constrained in the horizontal direction (x axis) in the nodes 11 and in both horizontal and vertical (x and y axes) in the lower corner node; a displacement along the x axis was applied to the nodes 11 of the other end (the vertical side of the image), which simulates the displacement of the transverse bar in a test machine. The displacements in direction y were left free.

From the analysis, following the Cell Method, of the values of displacement, the first datum obtainable from the simulated mechanical test was the compression value of the apparent Young module along the x axis of the model of cells 12 or the bone structure examined, which was 143 MPa.

The tensions acting in each cell 12 as a consequence of the load applied in the simulated test were also evaluated. To be more exact, the principal stresses were identified and the most stressed points were evaluated with respect to a nominal stress value of a structure with zero porosity, that is, with all the cells 12 with a unitary index. This procedure also allows, for a more accurate prediction of the risk of fracture, to calculate the stresses and identify the zones of greatest risk according to two known failure theories, such as a maximum normal tension, or Rankin's theory, and a theory of distortion energy, or von Mises' theory.

Figure 6:
FIG. 6 is a processed image of other sections of the image in FIG. 2.

A second portion of the sample was then examined, obtained from the same three-dimensional reconstruction of the sample (FIG. 2), but this time sectioned in a different direction (FIG. 6). Given that the mechanical properties of the bone structure are very anisotropic, that is, they depend on the direction in which the load is applied, the comparison with the previously examined structure allowed obtaining indications on the validity of the system proposed.

Figure 7:
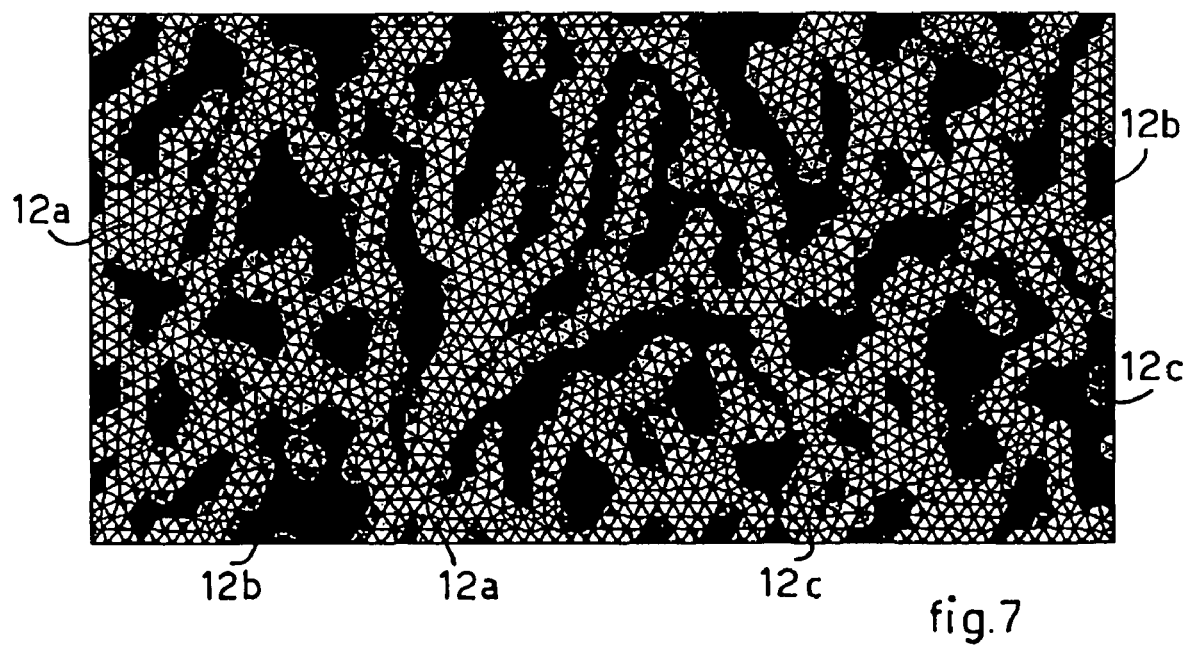
FIG. 7 is a discreet structure image corresponding to the image in FIG. 6.
Figure 8:
FIG. 8 is a first digital radiographic image.
Figure 9:
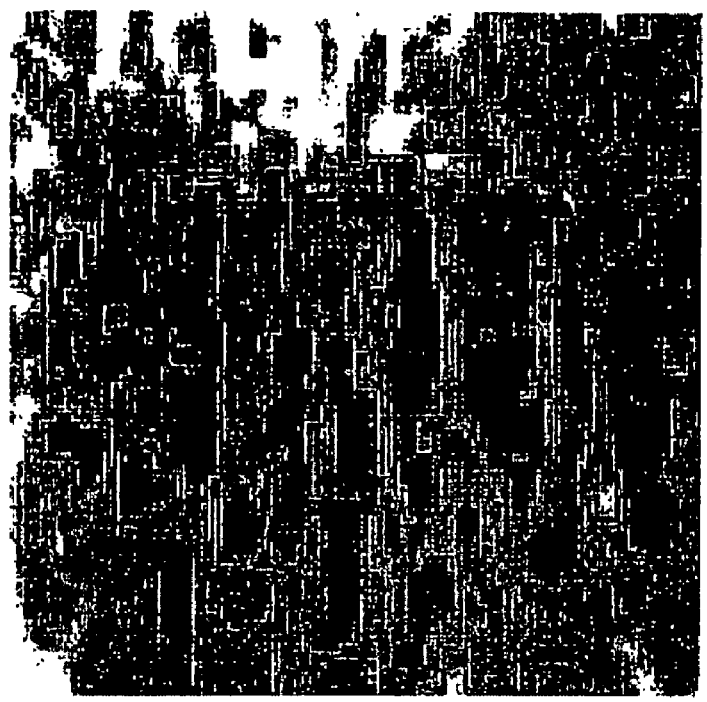
FIG. 9 is a processed image of a zone of the image in FIG. 8.

The grid of nodes was the same as the one used before, and also the complex of cells. The discretized structure is shown in FIG. 7, and in this case too a porosity factor of 60.9 was obtained.

A simulation was made for this second structure too, performed with the same methodology as the previous one and analyzed with the Cell Method.

The apparent Young module of the model of the second bone structure was equal to 37 MPa, a much lower value than that found in the first simulation.

This result is due to the fact that the bone structure is arranged in a very different way in the two cases, and therefore, even when there is an equal porosity value, different results are obtained from the structural analysis. Moreover, the trabecula of the first structure are mainly oriented along the axis of compression in the simulated test (long side of the image), whereas this is not so for the second structure, which in fact has a great decline in the mechanical properties.

In accordance with a second form of embodiment, with reference to FIGS. 8 to 13, the method according to the present invention is used to identify the specific mechanical properties of the bone structure in humans. A digital radiographic image (FIG. 8) was obtained of a human hand belonging to a clinically negative subject (no osteoporosis) by means of a digital radiography with a flat panel produced by General Electric and taken in a hospital department. As in the previous embodiment, the method provides to assume as an input parameter the mechanical characteristics of the base bone structure, particularly the constitutive law. Inside the radiographic image a zone is identified wherein the investigation is performed, in this specific case, in the proximal zone of the first phalange of the ring finger, although, obviously, many other parts of the body can be used.

Figure 10:
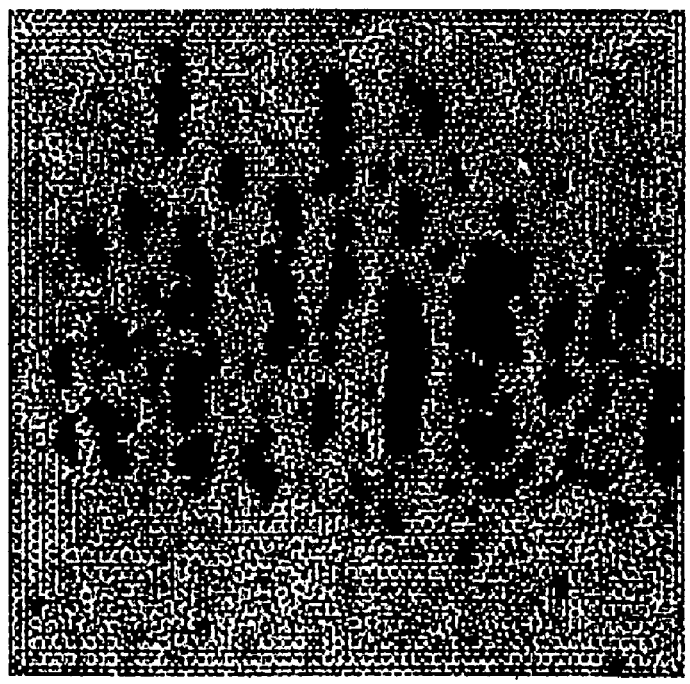
FIG. 10 is a discreet structure image corresponding to the image in FIG. 9.
Figure 11:
FIG. 11 is a second digital radiographic image.

The image of the zone identified is oriented so as to have the horizontal direction, axis x, orthogonal to the direction of the finger and the vertical direction, axis y, along the phalange. The bone matrix is extracted by means of applying particular non-linear filters (in this specific case a sub-threshold erosion filter, but other implementations are possible, such as for example part threshold filters, discrimination filters, filters in the space and frequencies domain, etc.). After processing, each pixel of the image in the selected zone has a value of the shade between 0 and 1. The result can be represented graphically with an image of the type shown in FIG. 9. On the resultant image a grid of 5662 nodes was deposited. The nodes were connected together so as to form a complex of 11050 triangular cells. An index value to be attributed to each cell was then obtained by adding together the values of the indexes of the corresponding nodes which constitute the vertexes thereof, the values of the indexes of the corresponding baricenters of each cell and the values of the indexes of the corresponding middle points of the sides of each cell, and by normalizing the result to 1 (but other implementations are possible). The physical significance of the index of the cell as thus defined is that it represents an indication of the percentage of bone in the cell. FIG. 10 shows the result of this operation.

The base mechanical characteristics were assumed for the bone, such as an elastic-linear isotropic constitutive law (but other constitutive laws are possible) with a Poisson ratio of 0.3 for all the cells that have an index other than 0. The cells with an index of 0 do not possess any mechanical characteristics. In the cells with an index of 1, a Young module (elastic module) was assumed, equal to 1 GPa. In the cells that have intermediate index values, the Young module was related to the value of the index. For example, if in a cell the index value is 0.5, the Young module of the cell is 0.5 GPa, and so on. FIG. 10 is therefore representative of the values assumed by the Young module of each cell.

The cells model was then subjected to two simulated compression tests, one along each side of the image (x and y axes). However, it comes within the field of the present invention that compression and shear tests can be simulated in different directions, or simulations of other types of tests, for example with one or more loads concentrated or distributed at points, lines and/or surfaces of the model, also as chosen by the operator, and different constraint conditions can be recreated, and/or the values of the displacements of the nodes of the model can be set.

In this specific case, displacements of the nodes on one end (the vertical side y of the image) of the cells model were constrained in the horizontal direction (x axis) in the nodes and in both horizontal and vertical (x and y axes) in the lower corner node; a displacement along the x axis was applied to the nodes of the other end (the vertical side y of the image), which simulates the displacement of the transverse bar in a test machine. The displacements in direction y were left free. The method was then repeated in an analogous manner, constraining the horizontal sides and imparting a displacement along the y axis of the image.

From the analysis, following the Cell Method, of the values of displacement, the datum obtainable from the first simulated mechanical test was the compression value of the apparent Young module along the x axis of the cells model of the bone structure examined, which was 279 MPa. Along the y axis, the value of the apparent Young module of the cells model of the bone structure examined in the second simulated test (along y axis) was 322 MPa, confirming the method's ability to identify the anisotropy of the bone structure examined.

A second digital radiographic image (FIG. 11) was then examined, of a human hand, belonging to a clinically positive subject (with recognized osteoporosis).

Figure 12:
FIG. 12 is a processed image of a zone of the image in FIG. 11.

Proceeding in the same way as previously described, the zone wherein to carry out the investigation is again identified in the proximal zone of the first phalange of the ring finger (FIG. 12). The image is oriented so as to have the horizontal direction, x axis, orthogonal to the direction of the finger and the vertical direction, y axis, along the phalange.

Figure 13:
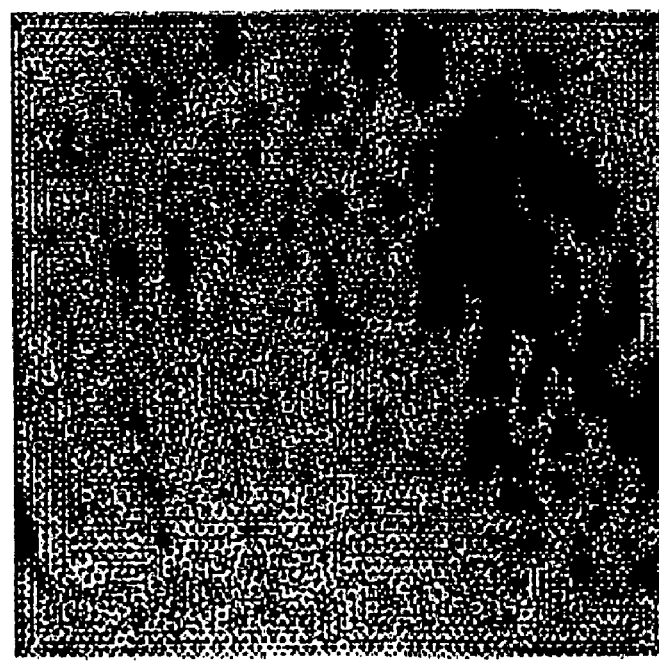
FIG. 13 is a discreet structure image corresponding to the image in FIG. 12.
Figure 13:

The grid of nodes was the same as the one used before, and also the complex of cells, the filter method and the method to attribute the index to the cells—that is, the whole method was repeated on the new image. The discretized structure is shown in FIG. 13.

Two simulations were made for this second structure too, performed with the same methodology as the previous one and analyzed with the Cell Method.

The apparent Young module of the model of the second structure examined in directions x and y of the image was respectively equal to 187 MPa and 258 MPa, lower values than those found in the first set of simulations, which result is due to the different resistance of the two structures examined, depending on the presence, in the second case, of a pathology which entails a great decline of the mechanical properties.

It is clear that modifications or addition of steps may be made to the method as described heretofore, without departing from the field and scope of the present invention.

It is also clear that, although the present invention has been described with reference to some specific examples, a person of skill in the field shall certainly be able to achieve many other equivalent forms of the method to identify the mechanical properties of a material, all of which shall come within the field and scope of the present invention.

The invention claimed is:

1. Method to identify the mechanical properties of a material, comprising:
   a first step comprising acquiring at least a digital image of a sample of said material, said digital image comprising elementary units
   a second step comprising acquiring, for every elementary unit of said digital image, at least a predetermined indicative parameter indicating at least one member of the group consisting of the presence of matter in said elementary image unit, the absence of matter in said elementary image unit, and type of matter in said elementary image unit, a third step comprising constructing a grid of elementary geometric elements, or cells, able to be associated with said digital image, a fourth step comprising assigning, for each of said cells, an index representative of the characteristics of the type of matter that occupies the position of a relative cell in relation to the parameters possessed by the elementary image units associated with such cell, a fifth step comprising defining the mechanical characteristics of each cell according to said index and the mechanical properties of the type of matter, and a sixth step comprising determining the mechanical properties of said material on the basis of numerical simulations carried out using the Cell Method.

2. Method as in claim 1, wherein during said numerical simulations at least one member of the group consisting of the strains, stresses and distribution of stresses suffered by said sample are analyzed on the basis of the mechanical characteristics of said cells, defined in said fifth step.

3. Method as in claim 2, wherein the constructing of the grid of said cells comprises a first sub-step to construct a grid of nodal points whose distance defines the lower limit of the size that characterizes the structure in the model examined and a second sub-step to define a plurality of cells, plane surfaces or spatial volumes, obtained by connecting said nodal points to each other.

4. Method as in claim 1, wherein the constructing of the grid of said cells comprises a first sub-step to construct a grid of nodal points whose distance defines the lower limit of the size that characterizes the structure in the model examined and a second sub-step to define a plurality of cells, plane surfaces or spatial volumes, obtained by connecting said nodal points to each other.

5. Method as in claim 4, wherein said cells cover at least one member of the group consisting of the entire surface region of said sample examined, and the entire volume of said sample examined.

6. Method as in claim 5, wherein each of said cells is obtained from a nodal point assumed at the time as a vertex and a plurality of adjacent nodal points are used to generate a localized complex of adjacent cells.

7. Method as in claim 4, wherein said cells are obtained assuming each nodal point as a vertex and a plurality of adjacent nodal points are used to generate a localized complex of adjacent cells.

8. Method as in claim 1, comprising dividing a three-dimensional image into a plurality of two-dimensional images obtained by sectioning said three-dimensional image according to a plurality of parallel planes, every point of the image assuming said indicative parameter indicative of the presence of matter deriving from the sum of the indexes of the corresponding points on all said planes.

9. Method as in claim 8, wherein said indicative parameter relates to the tone of gray scale of said point of said digital image.

10. Method as in claim 1, wherein said indicative parameter relates to the tone of gray scale of said point of said digital image.

11. Method as in claim 1, wherein in said sixth step compression and shear tests are simulated in predetermined directions of a portion of said material examined.

12. Method as in claim 1, wherein said cells define points, lines and surfaces, wherein in said sixth step load tests are simulated, said load being concentrated or distributed at points, lines, surfaces or their combinations of said cells.

* * * * *